United States Patent Office 2,895,979
Patented July 21, 1959

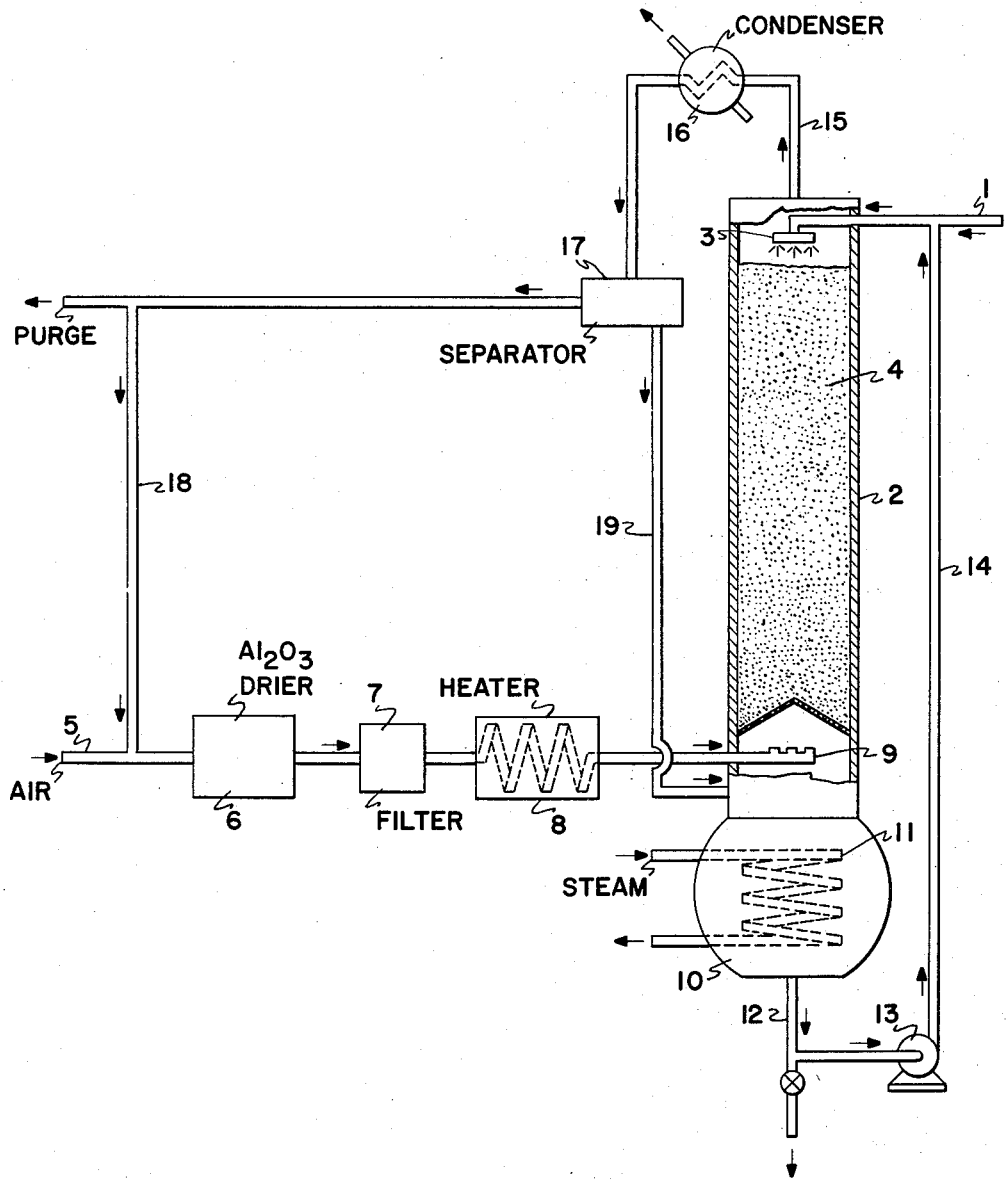

2,895,979

OXIDATION OF HYDROCARBON DRYING OILS

William Benjamin Segraves, Baton Rouge, La., and George Oliver Hillard, Jr., Westfield, N.J., assignors to Esso Research and Engineering Company, a corporation of Delaware Application June 13, 1957, Serial No. 665,571

6 Claims. (Cl. 260—451)

This invention relates to a method for the oxidation of liquid hydrocarbon drying oils and more particularly relates to an improved method for the air blowing of such oils.

It is known to prepare liquid hydrocarbon drying oils by polymerizing diolefins, such as butadiene, or mixtures thereof with vinyl aromatic hydrocarbons, such as styrene, in the presence of alkali metal catalysts, such as sodium, and a hydrocarbon diluent. However, such oils have been deficient in drying properties, requiring prolonged drying exposures where conventional film thickness is used or giving soft films where heavier film thicknesses are used. In thin films the oils can be dried satisfactorily as by baking, but the thickness which can be satisfactorily dried under such conditions has been considerably under that which the coating industry regards as being practical. Heavier films and fat edges have exhibited poor thru-dry properties. Moreover, the hydrocarbon drying oils in most instances have been incompatible with other film-forming materials such as alkyl resins and nitrogen-containing resins. In addition, they could seldom be dissolved in oxygenated solvents in useful concentrations. Consequently, only a restricted group of solvents could be used in formulating coating solutions. Furthermore, these drying oils have possessed poor pigment-wetting properties, in consequence of which it has been difficult to prepare enamels of the desired gloss and appearance.

It has previously been proposed to overcome these disadvantages of the hydrocarbon drying oils by blowing them with air or oxygen while maintaining them in the form of a homogeneous solution in one or more solvents, particularly those having a Kauri Butanol value of at least 40, i.e., those having a substantially high aromatic content, preferably in the presence of catalysts such as metallic driers (e.g., those composed of or containing lead, iron, cobalt, manganese, zinc, etc., in the form of naphthenates, octoates, oleates and the like), peroxides or dispersed alkaline salts.

It has been found, however, that the length of time necessary to introduce 8–10% or more oxygen into the oil by air blowing requires a length of time which is commercially unattractive being in the order of 16 hours or more, often days.

In accordance with the present invention it has been discovered that the time necessary to introduce 8–10% or more oxygen into the oil by air blowing can be drastically reduced by contacting the oil in the form of thin films with air under pressures above atmospheric, 9–11% oxygen being incorporated in about 4 to 9 hours.

The hydrocarbon drying oils which are suitable for oxidizing in accordance with this invention are oily polymers of butadiene, isoprene, dimethyl butadiene, piperylene, methyl pentadiene or other conjugated diolefins having four to six carbon atoms per molecule. Instead of polymerizing any of the aforesaid diolefins alone, they may be copolymerized in admixtures with each other or in admixtures with minor amounts of ethylenically unsaturated monomers copolymerizable therewith, e.g., with 0 to 40% of styrene, styrenes having alkyl groups substituted on the ring such as para methyl styrene, dimethyl styrene or diethyl styrene, acrylonitrile, methacrylonitrile, methyl acrylate, methyl methacrylate and the like. Such synthetic oils may be advantageously prepared by mass polymerization either in the presence of a hydrocarbon soluble peroxide catalyst such as benzoyl peroxide or cumene hydroperoxide, or in the presence of metallic sodium when the monomers consist of a diolefin or of a mixture of a diolefin with a styrene compound. Under proper conditions the emulsion polymerization technique may also be adapted to the preparation of drying oils to which the present invention is applicable. Suitable polymerization methods are illustrated below. Throughout the present description it will be understood that all proportions are expressed on a weight basis unless otherwise specified.

SYNTHESIS METHOD A

For example, 100 parts of butadiene-1,3, 50 parts of straight run mineral spirits boiling between 150° and 200° C. (Varsol), 3 parts of t-butyl hydroperoxide (60% pure) and 0.75 part of diisopropyl xanthogen disulfide are heated in a closed reactor at about 90° C. for 40 hours, whereupon the residual pressure is released and unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some t-butyl alcohol. This solution of polymer is then preferably fractionated to remove the dimer and usually adjusted to 50% non-volatile matter content. The non-volatile constituent, which is the oily polymer of butadiene, has a molecular weight between 1,000 and 10,000, preferably between 2,000 and 5,000. It will be understood, of course, that the foregoing procedure is only illustrative and that it can be modified in many ways, particularly as described in U.S. Patent No. 2,586,594 of Arundale et al. which describes alternative monomers, catalysts, reaction diluents, polymerization modifiers, suitable ranges of proportions of the various ingredients, suitable ranges of polymerization conditions, etc., the teachings of which are incorporated herein.

SYNTHESIS METHOD B

An alternative polymerization method using sodium as catalyst is illustrated as follows: 80 parts of butadiene-1,3, 20 parts of styrene, 200 parts of straight run mineral spirits boiling between 150° and 200° C., 40 parts of dioxane, 0.2 part of isopropanol and 1.5 parts of finely dispersed sodium are heated at about 50° C. in a closed reactor provided with an agitator. Complete conversion is obtained in about 4.5 hours whereupon the catalyst is destroyed by adding an excess of glacial acetic acid, sulfuric acid or other anhydrous organic acid or by filtering through clay or the like. The colorless product is then fractionally distilled to remove hydrocarbon diluent and modifiers such as dioxane until a product containing about 50%–100% non-volatile matter is obtained.

Again it will be understood that the described sodium polymerization method may be varied considerably as by omitting the styrene co-reactant; or by adding the styrene only after the polymerization of butadiene monomer has begun; or dioxane may be replaced by 10 to 35 parts of another ether modifier having 3 to 8 carbon atoms such as diethyl ether, methyl ethyl ether, dibutyl ether, or phenetole; or the modifier may be omitted altogether, especially when it is not essential to obtain a perfectly colorless product. Similarly, isopropanol is not necessary, through aliphatic alcohols of 1-6 carbon atoms generally have the beneficial effect of promoting the reaction when present in amounts ranging from about 2 to 50% based on the weight of sodium catalyst. Furthermore, the mineral spirits may be replaced by other inert hydrocarbon diluents boiling between about —15° C. and 250° C., preferably between 60° and 200° C., e.g., butane, benzene, xylene, naphtha, cyclohexane, and the like, e.g. Solvesso 100 (an aromatic fraction boiling 157°–177° C., and having a Kauri Butanol value of 98–100). The diluents are usually used in amounts ranging from 50 to 500 parts per 100 parts of monomer. The reaction temperature may vary between about 40° C. and 105° C., preferably around 50° to 85° C. As a catalyst, 0.1 to 10 parts of dispersed metallic sodium is used per 100 parts of monomers, sodium particle sizes below 100 microns being particularly effective.

A particularly suitable process for the preparation of the polymer oil in accordance with this synthesis is that described in U.S. Patent 2,762,851, issued September 11, 1956, to Anthony H. Gleason, or the multistage continuous process described and claimed in Serial No. 485,392, filed February 1, 1955, in the name of Stanley E. Jaros et al. The disclosures of these applications are incorporated herein by reference.

The polymers produced by the above process have molecular weights up to 10,000 and viscosities up to 22 poises at 50% N.V.M. and are pale yellow to colorless liquids.

In accordance with this invention the above polymer oils are oxidized by passing the oil downwardly through a tower filled with packing such as Berl saddles, Raschig rings and the like countercurrent to a stream of air introduced at the bottom of the column. The base of the column is heated, as by steam. The oil is continuously recycled from the bottom to the top of the column. One of the features of the invention is the maintenance of a pressure of at least 70 lbs. per sq. in. gage on the tower since it has been found that this materially shortens the length of time needed to introduce the desired amount of oxygen into the oil when the oil is contacted with the oxygen in the form of thin films. The pressure can be as high above 70 lbs. as necessary or desirable but for practical purposes it is not desirable to go above 200-250 lbs. Above such pressures, special equipment is necessary. However, if desirable the pressures may go as high as 1000 lbs. or even higher.

The invention will be better understood from the accompanying drawing which is a schematic illustration of one means for carrying out the invention.

Referring therefore to the drawing, a liquid hydrocarbon drying oil prepared suitably in accordance with the teachings of the Gleason Patent U.S. 2,762,851 are introduced by line 1 into the top of column 2 through spray nozzle 3. Column 2 is filled with non-adsorptive packing 4, such as Berl saddles, Raschig rings or the like. The oil flows down through the packing in column 2 in the form of thin films where it is contacted with air introduced through line 5, $Al_2O_3$ drier 6, filter 7, heater 8 and distributing plate 9. Oil leaving the column 2 collects in the kettle 10 heated by steam coil 11 and is continuously drawn off through line 12 and recycled by pump 13 and line 14 to the top of the column. Thus the charge of hydrocarbon oil is continuously circulated through the packed column until the desired amount of oxygen has been incorporated into the oil. The column is maintained under a pressure of about 50–100 lbs. per sq. in. gage, and at a temperature between 20° and 150° C., preferably between 100° and 130° C. The rate of recycle through line 14 is maintained at between 15 and 35 gal./per minute per sq. ft. of tower cross-sectional area.

Vaporized solvent and air are removed from the column through line 15. The solvent is condensed by cooler 16 and collected in separator 17 from which air is removed through line 18 and returned to air line 5 or vented. The condensed solvent may be returned to the column through line 19.

The nature of the oxidized diolefin polymer of this invention depends largely upon the extent to which the oxidation is carried. The degree or extent of oxidation in turn depends on various factors including time of oxidation, temperature, presence or absence of catalysts, type of solvent, etc. In general, greater extent of oxidation results in less solubility of the oxidized polymer in paraffin hydrocarbon solvents. The oxidation can be carried out such that the product is soluble in paraffinic hydrocarbons indicating that the oxidation has proceeded to a relatively slight extent. The oxidation can also be carried out so that the product is insoluble in paraffinic solvents but is soluble in aromatic solvents indicating that the oxidation has proceeded to a high degree. In accordance with the discoveries of the present invention, the length of time for a given degree of oxidation can be shortened by the use of pressures of 70 p.s.i.g. or more while recycling the oil through the column in the form of thin films.

The product as pointed out above functions as an excellent enamel base. Depending on the type of pigment employed and eventual use contemplated, the concentration of pigment may be varied in various enamels within very broad ranges such as between 5 and 75% based on the weight of non-volatile polymeric constituents of the drying oil base. For example, carbon black is usually used in concentrations ranging from 6 to 10%, titanium dioxide 40 to 60%, and lead pigments in even higher concentrations. Of course, in preparing the initial paste concentrations as high as 300 parts of pigment per 100 parts of drying oil base are not uncommon. The compositions can be extended or mixed with suitable hydrocarbon solvents boiling between about 80° and 200° C. which solvents may be of the type used as reaction diluents in the oil synthesis aforesaid or with other solvents such as Varsol, xylene, mineral spirits, naphthas, and Solvesso, white oils, as well as mixed aromatics in the benzene and xylene range.

Furthermore, while the oxygen treated oily products of the invention by themselves yield protective coatings having well balanced properties, they can be modified further by mixing therewith other drying oils such as linseed oil, tung oil, soybean oil, or other unsaturated vegetable oils.

Further advantages of the invention will be evident from a consideration of the following experimental data which are given for the sake of illustration but without intention of limiting the invention thereto.

*Example I*

A plurality of runs were made in each of which fifteen gallons of 80% butadiene-20% styrene copolymer oil made by sodium copolymerization in accordance with synthesis B were blown with air in a six-inch diameter column filled with 15 ft. of ½-inch Raschig ring packing. The column was constructed of 18-8 chrome-nickel stainless steel with a carbon steel jacket. The bottom of the column was fitted with an 18-gallon stainless steel kettle provided with a steam coil. The oil was continuously recycled through the column by means of a five-gallon per minute stainless steel pump. Air, dried over alumina, filtered and preheated was distributed to the bottom of the column through a micro-metallic grid plate at the bottom of the packed section to insure the formation of small bubbles of air. A total of eleven runs were made at temperatures between 232° and 244° F. and under pressures between 50 and 73 lbs. per sq. in. gage. The following data were obtained:

| Run No. | Press., p.s.i.g. | Polymer chg., Lb. | Temp., °F. | Recycle rate, g.p.m. | Air, cu. ft./ min. | Number of hrs. to put 10% $O_2$ in oil | Percent $O_2$ in air converted |
|---|---|---|---|---|---|---|---|
| 1 | 73 | 46 | 240 | 5.1 | 8.0 | 4.35 | 12.8 |
| 2 | 72 | 48 | 244 | 5.1 | 4.4 | 5.32 | 19.0 |
| 3 | 72 | 45 | 232 | 4.5 | 4.2 | 6.06 | 17.5 |
| 4 | 72 | 48 | 243 | 4.5 | 4.2 | 5.78 | 18.3 |
| 5 | 72 | 50 | 242 | 6.7 | 3.9 | 4.21 | 27.3 |
| 6 | 73 | 48 | 238 | 6.0 | 4.1 | 4.33 | 25.0 |
| 7 | 71 | 48 | 241 | 5.9 | 4.0 | 4.13 | 27.5 |
| 8 | 50 | 45 | 240 | 3.2 | 5.2 | 10.34 | 8.2 |
| 9 | 54 | 48 | 242 | 4.2 | 3.9 | 8.43 | 13.5 |
| 10 | 52 | 50 | 235 | 3.8 | 4.2 | 8.64 | 12.3 |
| 11 | 55 | 48 | 237 | 5.3 | 3.6 | 6.78 | 18.2 |

The above data, which have been adjusted to a basis of constant mass of oxygen conversion (10% on 50 lbs. polymer), i.e., to the length of time necessary to put 10% oxygen into the oil, show that the rate of oxygen absorption is proportional to the pressure. However, the first seven runs show that the pressure should be at least 70 lbs. per sq. in. gage in order to reduce the time of oxidation to a suitable level.

By the application of the method of least squares to an analysis of the above data the following equation has been determined:

$$\theta = 0.2335 \frac{W^{2.22625}}{P^{0.86014} G^{1.05289}}$$

where $\theta$ is the time necessary to introduce 10% oxygen into the polymer; W is the polymer charge, lb.; P is the pressure in pounds per sq. in. absolute; and G is the recycle rate in gallons per minute.

This equation shows that the pressure is the most important practical variable in determining the length of time necessary to oxidize the polymer to a predetermined level of oxidation.

The nature and objects of the present invention having been thus fully set forth and specific examples of the same given, what is claimed as new and useful and desired to be secured by Letters Patent is:

1. In a process for improving the properties of a polymeric hydrocarbon drying oil of an acyclic conjugated diolefin having 4 to 6 carbon atoms per molecule, said polymer being prepared by mass polymerization with a catalyst selected from the group consisting of a hydrocarbon soluble peroxide and metallic sodium in which the oil is contacted with oxygen in the presence of a hydrocarbon solvent having Kauri-Butanol value of at least 40, the improvement which comprises incorporating above 8% oxygen in said drying oil within 9 hours by contacting the oil with the oxygen in the form of thin films in a packed column and continuously recycling the oil from one end of the column to the other while maintaining a pressure of at least 70 lbs. per square inch gage on the column.

2. Process according to claim 1 in which the oil is recycled at a rate between about 15 and 35 gallons per minute per square foot of tower cross-sectional area.

3. Process according to claim 2 in which the oil is passed downwardly through the column countercurrent to the oxygen.

4. In a process for improving the properties of a polymeric hydrocarbon drying oil of an acyclic conjugated diolefin having 4 to 6 carbon atoms per molecule, said polymer being prepared by mass polymerization with a catalyst selected from the group consisting of a hydrocarbon soluble peroxide and metallic sodium in which the oil is contacted with oxygen in the presence of a hydrocarbon solvent having Kauri-Butanol value of at least 40, the improvement which comprises incorporating above 8% oxygen in said drying oil within 9 hours by continuously passing the oil downwardly in the form of thin films through a packed column countercurrent to the oxygen while maintaining a pressure on the column in accordance with the equation:

$$P^{0.86014} = 0.2335 \frac{W^{2.22625}}{\theta G^{1.05289}}$$

where P is pressure in pounds per square inch absolute above 84.7, W is the polymer charge in pounds, $\theta$ is the time necessary to introduce 10% oxygen into the polymer, and G is the recycle rate through the column in gallons per minute.

5. Process according to claim 4 in which the polymeric drying oil being oxidized is a copolymer of 80% butadiene and 20% styrene prepared in the presence of sodium as the catalyst.

6. Process according to claim 1 in which the polymeric drying oil being oxidized is a copolymer of 75 to 85% butadiene and 25 to 15% styrene prepared in the presence of sodium as a catalyst.

References Cited in the file of this patent
UNITED STATES PATENTS

| | | |
|---|---|---|
| 1,780,632 | Pungs | Nov. 4, 1930 |
| 2,122,826 | Van Peski | July 5, 1938 |
| 2,369,710 | Bludworth | Feb. 20, 1945 |
| 2,580,184 | Murray | Dec. 25, 1951 |
| 2,631,160 | Linn | Mar. 10, 1953 |
| 2,672,425 | Gleason et al. | Mar. 16, 1954 |
| 2,701,780 | Nelson et al. | Feb. 8, 1955 |
| 2,824,119 | Gardner et al. | Feb. 18, 1958 |